(12) United States Patent
Kim

(10) Patent No.: US 9,012,070 B2
(45) Date of Patent: Apr. 21, 2015

(54) SECONDARY BATTERY

(75) Inventor: Hoseong Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 269 days.

(21) Appl. No.: 13/478,031

(22) Filed: May 22, 2012

(65) Prior Publication Data

US 2013/0052521 A1 Feb. 28, 2013

(30) Foreign Application Priority Data

Aug. 31, 2011 (KR) ........................ 10-2011-0088067

(51) Int. Cl.
*H01M 2/06* (2006.01)
*H01M 2/08* (2006.01)
*H01M 2/02* (2006.01)

(52) U.S. Cl.
CPC ............... *H01M 2/021* (2013.01); *H01M 2/08* (2013.01); *H01M 2/06* (2013.01)

(58) Field of Classification Search
None
See application file for complete search history.

(56) References Cited

U.S. PATENT DOCUMENTS

| 2010/0255368 A1 | 10/2010 | Park et al. |
| 2010/0310930 A1 | 12/2010 | Park et al. |

FOREIGN PATENT DOCUMENTS

| JP | 2000-353498 | | 12/2000 |
| JP | 2005-108486 | | 4/2005 |
| KR | 10-2004-0016701 | | 2/2004 |
| KR | 10-2008-0022915 | A | 3/2008 |
| KR | 10-2009-0065587 | A | 6/2009 |
| KR | 10-2010-0099063 | A1 | 9/2010 |
| WO | WO 2012/162813 | * | 12/2012 |

OTHER PUBLICATIONS

Patent Abstracts of Japan, and English machine translation of Japanese Publication 2000-353498 listed above, (10 pages).
Patent Abstracts of Japan, and English machine translation of Japanese Publication 2005-108486 listed above, (15 pages).

* cited by examiner

*Primary Examiner* — Jonathan Crepeau
(74) *Attorney, Agent, or Firm* — Christie, Parker & Hale, LLP

(57) ABSTRACT

A secondary battery including an electrode assembly; a pouch case accommodating the electrode assembly and including an unsealed part and a sealed part at a wing portion of the pouch case; and an electrode tab including a first side electrically connected to the electrode assembly, and a second side drawn out from the pouch case through the wing portion, and the unsealed part includes a first unsealed part at an outer periphery of the wing portion which is directed toward the second side of the electrode tab, and a second unsealed part at an inner periphery of the wing portion which is directed toward the electrode assembly, and the sealed part is between the first unsealed part and the second unsealed part.

17 Claims, 4 Drawing Sheets

SECONDARY BATTERY

CROSS-REFERENCE TO RELATED APPLICATION

This application claims priority to and the benefit of Korean Patent Application No. 10-2011-0088067, filed on Aug. 31, 2011 in the Korean Intellectual Property Office, the entire content of which is incorporated herein by reference.

BACKGROUND

1. Field

Aspects of embodiments of the present invention relate to a secondary battery.

2. Description of the Related Art

Generally, a secondary battery is chargeable and dischargeable and is widely used as a power source for various portable small electronic devices, such as cellular phones, personal digital assistants (PDAs), notebook computers, and the like. In particular, lithium (Li) secondary batteries having an operation voltage of 3.6V, which is about three times the operation voltage of comparable Ni—Cd or Ni-MH batteries, and exhibiting a relatively high energy density per unit weight, have been increasingly widely used.

In a typical Li secondary battery, a lithium-based oxide may be used as a positive electrode active material, and a carbon-based material may be used as a negative electrode active material. The Li secondary battery may be manufactured in various shapes, e.g., cylindrical can types, rectangular or prismatic can types, pouch types, etc.

In addition, Li secondary batteries may be classified as Li ion batteries using liquid electrolyte and polymer electrolyte batteries using polymer solid electrolyte, depending on the electrolyte used therein. Liquid polymer batteries may be classified as pure solid-type Li polymer batteries without electrolyte and gel-type polymer batteries with electrolyte, depending on the solid polymeric electrolyte used therein.

The Li polymer battery using polymeric solid electrolyte includes a pouch generally formed of a metal thin film as a receptacle of an electrode assembly, and peripheral portions of the pouch are sealed in a state in which the electrode assembly is placed into the pouch. Ends of positive and negative electrode tabs electrically connected to positive and negative electrodes of the electrode assembly are drawn out from the pouch to then be electrically connected to a protection circuit board.

In the aforementioned conventional pouch-type secondary battery, edge portions of three sides of the pouch are sealed. Specifically, the sealing of a terminal portion, that is, a top portion, of the pouch is performed linearly in an oblong shape. Here, the sealing may have both advantages and disadvantages depending on whether the sealing is performed closer to a cell space of the pouch accommodating the electrode assembly or to the drawn electrode tabs.

In the former case, an inner layer lifting phenomenon, in which an inner layer of the pouch is melted and lifted as a result of the sealing, is not exhibited outside the outer line of the pouch, which is advantageous in attaining a desired total height margin of the pouch. In this case, however, there is a risk of a separator being partially lifted and fused by the electrode tabs. In addition, several problems, including a reduction in electrolyte impregnating capability, degassing, or the like, may be undesirably caused.

By contrast, in the latter case, occurrence of fusion of the separator is avoidable. However, the inner layer lifting phenomenon may be exhibited, which is disadvantageous in attaining a desired total height margin of the pouch.

SUMMARY

According to an aspect of embodiments of the present invention, a secondary battery has sealed parts, which can prevent or substantially prevent problems due to separator fusion, such as a reduction in electrolyte impregnating capability, or degassing. According to another aspect of embodiments of the present invention, a secondary battery has a desired total height margin due to an occurrence of an inner layer lifting phenomenon being prevented or reduced.

According to an embodiment of the present invention, a secondary battery includes: an electrode assembly; a pouch case accommodating the electrode assembly and including an unsealed part and a sealed part at a wing portion of the pouch case; and an electrode tab including a first side electrically connected to the electrode assembly, and a second side drawn out from the pouch case through the wing portion, and the unsealed part includes a first unsealed part at an outer periphery of the wing portion which is directed toward the second side of the electrode tab, and a second unsealed part at an inner periphery of the wing portion which is directed toward the electrode assembly, and the sealed part is between the first unsealed part and the second unsealed part.

A width of each of the first unsealed part and the second unsealed part may be less than a width of the sealed part.

The first unsealed part and the second unsealed part may be line-shaped.

A width of the sealed part may be less than a width of the wing portion.

The sealed part may be line-shaped.

A sum of widths of the first and second unsealed parts may be less than a width of the sealed part.

According to another embodiment of the present invention, a secondary battery includes: an electrode assembly; a pouch case accommodating the electrode assembly and including a sealed part at a portion of a wing portion of the pouch case; and an electrode tab including a first side electrically connected to the electrode assembly, and a second side drawn out from the pouch case through the wing portion, and the sealed part includes a first sealed part at a location corresponding to the electrode tab, and a second sealed part at another location not corresponding to the electrode tab, the first sealed part being adjacent to an outer side of the wing portion directed toward the second side of the electrode tab, and the second sealed part being adjacent to an inner side of the wing portion directed toward the electrode assembly.

A width of the first sealed part may be less than a width of the wing portion.

A width of the second sealed part may be less than a width of the wing portion.

A width of the first sealed part may be equal to a width of the second sealed part.

The wing portion may include a first unsealed part between the outer side of the wing portion and the first sealed part.

The wing portion may include a second unsealed part between the outer side of the wing portion and the second sealed part.

The wing portion may include a third unsealed part between the first sealed part and the inner side of the wing portion.

The wing portion may include a fourth unsealed part between the second sealed part and the inner side of the wing portion.

The wing portion may include a first unsealed part between the outer side of the wing portion and the first sealed part, and a second unsealed part between the outer side of the wing portion and the second sealed part, and a width of the first unsealed part may be less than a width of the second unsealed part.

The wing portion may include a third unsealed part between the first sealed part and the inner side of the wing portion, and a fourth unsealed part between the second sealed part and the inner side of the wing portion, and a width of the third unsealed part may be greater than a width of the fourth unsealed part.

The wing portion may include a first unsealed part between the outer side of the wing portion and the first sealed part, and a third unsealed part between the first sealed part and the inner side of the wing portion, and a width of the first unsealed part may be less than a width of the third unsealed part.

The wing portion may include a second unsealed part between the outer side of the wing portion and the second sealed part, and a fourth unsealed part between the second sealed part and the inner side of the wing portion, and a width of the second unsealed part may be greater than a width of the fourth unsealed part.

A portion of the first sealed part and a portion of the second sealed part may overlap each other.

As described above, in the secondary battery having sealed parts according to aspects of embodiments of the present invention, problems due to fusion of a separator, including a reduction in electrolyte impregnating capability, degassing, or the like, can be prevented or substantially prevented, and a total height margin can be attained by avoiding an inner layer lifting phenomenon.

Additional aspects and/or advantages of the present invention are set forth in the following description and, in part, will be obvious from the description, or may be learned by practice of the invention.

BRIEF DESCRIPTION OF THE DRAWINGS

The above and other features and aspects of the present invention will become more apparent to those of ordinary skill in the art by describing in detail some exemplary embodiments with reference to the attached drawings, in which.

DETAILED DESCRIPTION

Some exemplary embodiments of the present invention are described more fully hereinafter with reference to the accompanying drawings; however, embodiments of the present invention may be embodied in different forms and should not be construed as limited to the exemplary embodiments illustrated and set forth herein. Rather, these exemplary embodiments are provided by way of example for understanding of the invention and to convey the scope of the invention to those skilled in the art. As those skilled in the art would realize, the described embodiments may be modified in various ways, all without departing from the spirit or scope of the present invention.

Figure 1A:
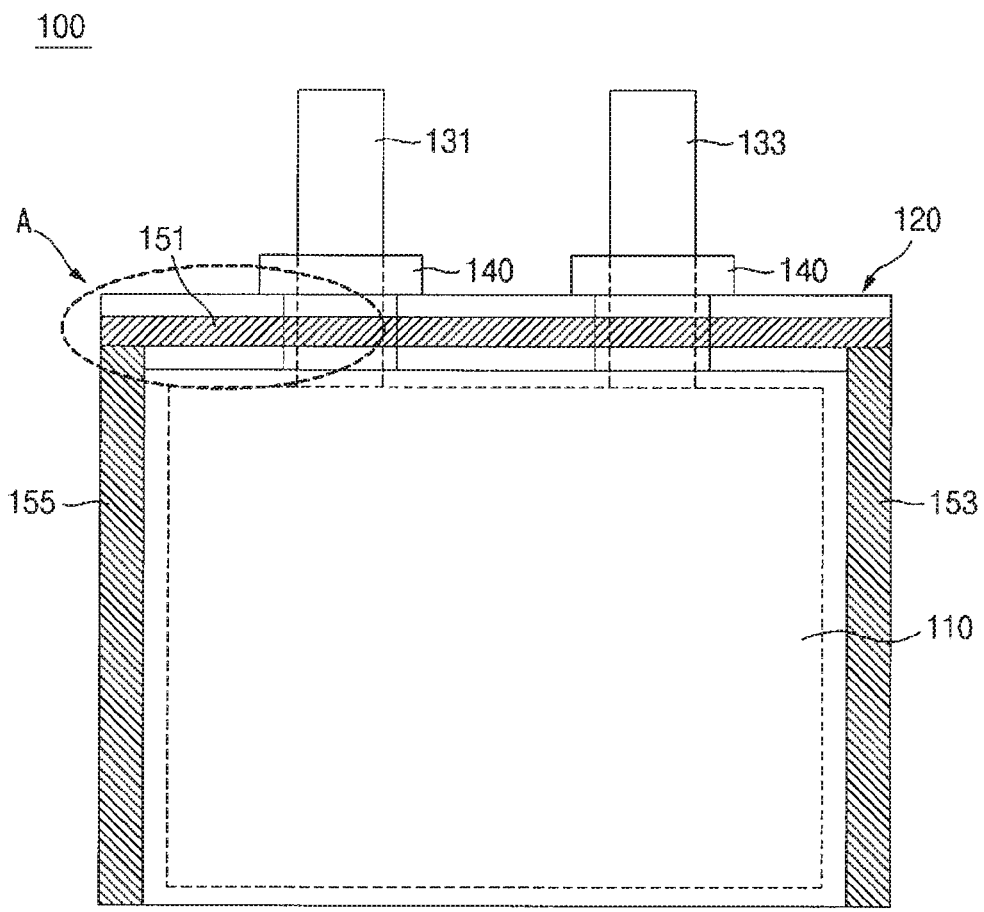
FIG. 1A is a schematic cross-sectional view of a secondary battery according to an embodiment of the present invention.
Figure 1B:
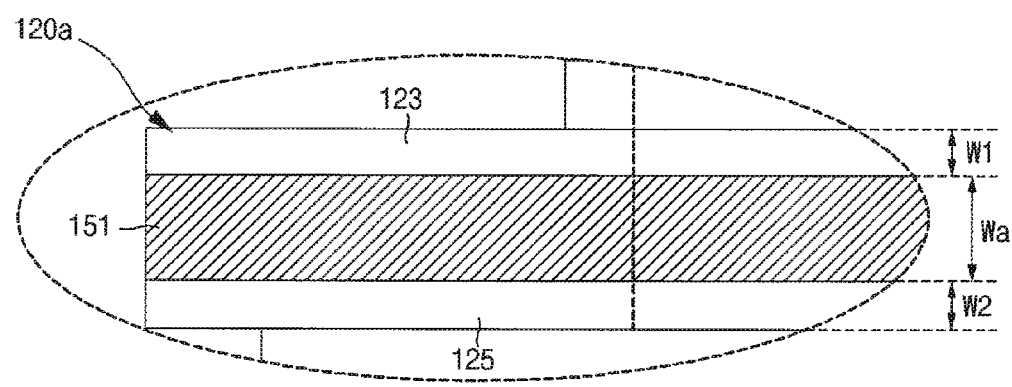
FIG. 1B is an enlarged view of a region "A" of FIG. 1A.

FIG. 1A is a schematic cross-sectional view of a secondary battery 100 according to an embodiment of the present invention, and FIG. 1B is an enlarged view of a region "A" of FIG. 1A.

Referring to FIGS. 1A and 1B, the secondary battery 100 according to an embodiment of the present invention includes an electrode assembly 110, a pouch case 120, electrode tabs 131 and 133, polymers 140, first, second, and third sealed parts 151, 153, and 155, and first and second unsealed parts 123 and 125.

The electrode assembly 110 includes a positive electrode, a negative electrode, and a separator disposed therebetween to perform charging and discharging. In one embodiment, the positive electrode and the negative electrode are generally plate-shaped. In one embodiment, the plate-shaped positive and negative electrodes and the separator are wound into a jelly roll configuration. In one embodiment, the positive electrode is formed by coating a positive electrode active material on a positive electrode plate made of a metal, and the negative electrode is formed by coating a negative electrode active material on a negative electrode plate made of a metal. The aforementioned configuration of the electrode assembly 110 according to one embodiment is substantially the same as a configuration of a general pouch-type secondary battery. Thus, in the present embodiment, further illustration and description of the electrode assembly 110 is omitted. In addition, the present embodiment is described herein with respect to a winding-type electrode assembly, by way of example; however, the present invention is also applicable to a stacked electrode assembly having a separator interposed between a positive electrode plate and a negative electrode plate.

The pouch case 120 accommodates the electrode assembly 110, and has the first, second, and third sealed parts 151, 153, and 155 formed at a wing portion of the pouch case 120 to seal the electrode assembly 110. Here, the wing portion may refer to a band-shaped structure formed along the edge of the pouch case 120. The wing portion of the pouch case 120, in one embodiment, includes an upper wing portion 120a located corresponding to the electrode tabs 131 and 133, and lateral wing portions formed at both lateral sides of the pouch case 120. The second and third sealed parts 153 and 155 may be formed on the entire surfaces of the lateral wing portions of the pouch case 120. The first sealed part 151 may be formed at only a portion of the upper wing portion 120a, and a sealing structure of the upper wing portion 120a, according to one embodiment of the present invention, is described further later herein with reference to FIG. 1B.

The pouch case 120, in one embodiment, has a multi-layered structure having a thermal adhesion layer, and opposing sealing layers thermally adhered to top and bottom portions of the pouch case 120, forming an inner surface of the pouch case 120.

The electrode tabs 131 and 133 may include a positive electrode tab 131 and a negative electrode tab 133. One side of each of the positive electrode tab 131 and the negative electrode tab 133 is electrically connected to the positive electrode and the negative electrode of the electrode assembly 110, respectively, and the other side of each of the positive electrode tab 131 and the negative electrode tab 133 is drawn outside of the pouch case 120 through the upper wing portion 120a of the pouch case 120 to form drawn parts. The drawn parts of the positive electrode tab 131 and the negative electrode tab 133 may be electrically connected to connection terminals of a printed circuit board (not shown), for example.

In one embodiment, a portion of the positive electrode tab 131 and a portion of the negative electrode tab 133 corresponding to the first sealed part 151 of the pouch case 120 are surrounded by the polymers 140 having an insulating property.

The sealing structure of the upper wing portion 120a of the pouch case 120, according to one embodiment of the present invention, is described in further detail below with reference to FIG. 1B.

As shown in FIG. 1B, the first sealed part 151 and the first and second unsealed parts 123 and 125 may be formed at the upper wing portion 120a of the pouch case 120.

The first unsealed part 123 is formed at the upper wing portion 120a, and more specifically, at an outer periphery of the upper wing portion 120a which is directed toward, or proximate, the drawn parts of the positive and negative electrode tabs 131 and 133. The second unsealed part 125 is formed at the upper wing portion 120a, and more specifically, at an inner periphery of the upper wing portion 120a which is directed toward, or proximate, the electrode assembly 110 within the pouch case 120. Here, the first and second unsealed parts 123 and 125 are parts of the upper wing portion 120a which are not sealed, and may be shaped as lines having widths (e.g., predetermined widths) W1 and W2, respectively.

The first sealed part 151 is formed between the first and second unsealed parts 123 and 125, and is a portion at which the upper wing portion 120a is thermally adhered.

The first sealed part 151, in one embodiment, is shaped as a line having a width (e.g., a predetermined width) Wa that is less than an overall width of the upper wing portion 120a. Here, the width Wa of the first sealed part 151 is preferably greater than or equal to a sum of the widths W1 and W2 of the first and second unsealed parts 123 and 125 to securely seal the electrode assembly 110 in the pouch case 120 by sufficiently securing an area of the first sealed part 151 while forming unsealed regions, such as the first and second unsealed parts 123 and 125.

According to an embodiment of the present invention, the sealed part is formed only between the outer and inner peripheries while the outer periphery of the upper wing portion 120a located corresponding to the drawn parts of the electrode tabs 131 and 133, and the inner periphery of the upper wing portion 120a, which is directed toward a cell space of the pouch case, are not sealed. Accordingly, one problem with the conventional sealed part structure, that is, an occurrence of separator fusion, can be avoided, thereby preventing or substantially preventing failings, including a reduction in electrolyte impregnating capability, degassing, or the like. Also, according to an embodiment of the present invention, another problem with the conventional sealed part structure, that is, occurrence of an inner layer lifting phenomenon, can be avoided, thereby attaining a desired total height margin of the pouch case.

A secondary battery according to another embodiment of the present invention is described below with reference to FIGS. 2A and 2B.

Figure 2A:
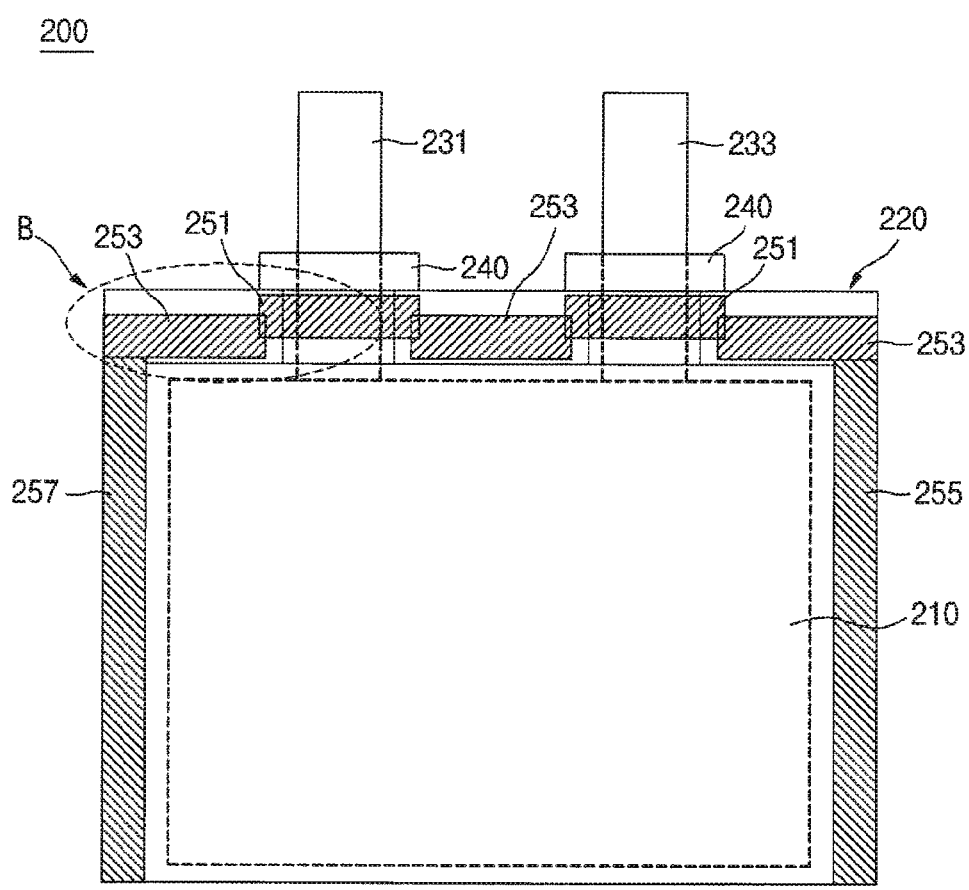
FIG. 2A is a schematic cross-sectional view of a secondary battery according to another embodiment of the present invention.
Figure 2B:
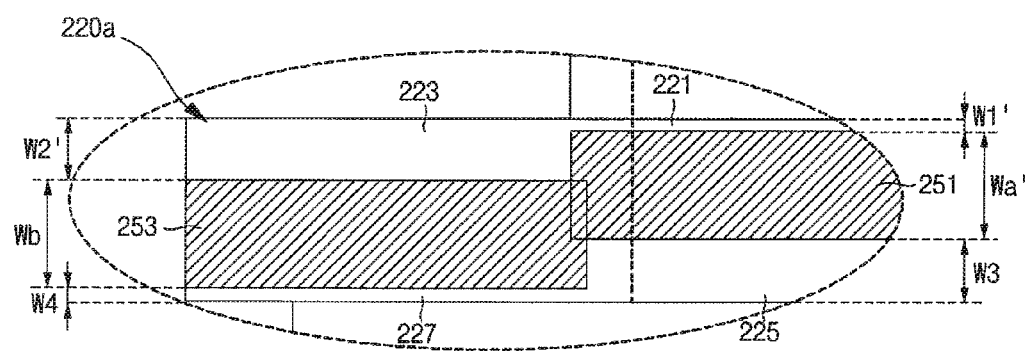
FIG. 2B is an enlarged view of a region "B" of FIG. 2A.

FIG. 2A is a schematic cross-sectional view of a secondary battery 200 according to another embodiment of the present invention, and FIG. 2B is an enlarged view of a region "B" of FIG. 2A.

Referring to FIGS. 2A and 2B, the secondary battery 200 according to an embodiment of the present invention includes an electrode assembly 210, a pouch case 220, electrode tabs 231 and 233, polymers 240, first, second, third, and fourth sealed parts 251, 253, 255, and 257, and first, second, third, and fourth unsealed parts 221, 223, 225, and 227.

The electrode assembly 210 includes a positive electrode, a negative electrode, and a separator disposed therebetween to perform charging and discharging. In one embodiment, the positive electrode and the negative electrode are generally plate-shaped. In one embodiment, the plate-shaped positive and negative electrodes and the separator are wound into a jelly roll configuration. In one embodiment, the positive electrode is formed by coating a positive electrode active material on a positive electrode plate made of a metal, and the negative electrode is formed by coating a negative electrode active material on a negative electrode plate made of a metal. The aforementioned configuration of the electrode assembly 210 according to one embodiment is substantially the same as a configuration of a general pouch-type secondary battery. Thus, in the present embodiment, further detailed illustration and description of the electrode assembly 210 is omitted. In addition, the present embodiment is described herein with respect to a winding-type electrode assembly, by way of example; however, the present invention is also applicable to a stacked electrode assembly having a separator interposed between a positive electrode plate and a negative electrode plate.

The pouch case 220 accommodates the electrode assembly 210, and has the first, second, third, and fourth sealed parts 251, 253, 255, and 257 formed at a wing portion of the pouch case 220 to seal the electrode assembly 210. The wing portion of the pouch case 220 includes an upper wing portion 220a located corresponding to the electrode tabs 231 and 233, and lateral wing portions formed at both lateral sides of the pouch case 220. The third and fourth sealed parts 255 and 257 may be formed on entire surfaces of the lateral wing portions of the pouch case 220. The first and second sealed parts 251 and 253 may be formed at only a portion of the upper wing portion 220a, and a sealing structure of the upper wing portion 220a is described further later herein with reference to FIG. 2B.

The pouch case 220, in one embodiment, has a multi-layered structure having a thermal adhesion layer and opposing sealing layers thermally adhered to top and bottom portions of the pouch case 220, forming inner surface of the pouch case 220.

The electrode tabs 231 and 233 may include a positive electrode tab 231 and a negative electrode tab 233. One side of each of the positive electrode tab 231 and the negative electrode tab 233 is electrically connected to the positive electrode and the negative electrode of the electrode assembly 210, respectively, and the other side of each of the positive electrode tab 231 and the negative electrode tab 233 is drawn outside of the pouch case 220 through the upper wing portion 220a of the pouch case 220 to form drawn parts. The drawn parts of the positive electrode tab 231 and the negative electrode tab 233 may be electrically connected to connection terminals of a printed circuit board (not shown), for example.

In one embodiment, a portion of the positive electrode tab 231 and a portion of the negative electrode tab 233, corresponding to the first sealed part 251 of the pouch case 220, are surrounded by the polymers 240 having an insulating property.

The sealing structure of the upper wing portion 220a of the pouch case 220, according to one embodiment of the present invention, is described in further detail below with reference to FIG. 2B.

As shown in FIG. 2B, the first and second sealed parts 251 and 253 and the first, second, third, and fourth unsealed parts 221, 223, 225, and 227 may be formed at the upper wing portion 220a of the pouch case 220.

The first and second sealed parts 251 and 253 may be formed at different locations of the upper wing portion 220a according to whether an electrode tab is drawn out or not.

The first sealed part 251 is formed at locations of the upper wing portion 220a, where the positive and negative electrode tabs 231 and 233 are drawn out, to be located adjacent to a top end, rather than a bottom end, of the upper wing portion 220a. Here, the top end (e.g., an outer end) of the upper wing portion 220a refers to an end of the upper wing portion 220a which is directed toward, or proximate, the drawn parts of the positive and negative electrode tabs 231 and 233, and the bottom end (e.g., an inner end) of the upper wing portion 220a refers to an end of the upper wing portion 220a which is directed toward, or proximate, a cell space of the pouch case 220, that is, an end directed toward, or proximate, the electrode assembly 210.

The second sealed part 253 may be formed at locations of the upper wing portion 220a where the positive and negative electrode tabs 231 and 233 are not drawn out, and may be located adjacent to the bottom end of the upper wing portion 220a. Widths Wa' and Wb of the first and second sealed parts 251 and 253, respectively, may be smaller than an overall width of the upper wing portion 220a. In addition, the widths Wa' and Wb of the first and second sealed parts 251 and 253 may be different from each other. However, the widths Wa' and Wb of the first and second sealed parts 251 and 253 are preferably equal to each other for stability thereof.

The first, second, third, and fourth unsealed parts 221, 223, 225, and 227 are parts of the upper wing portion 220a which are not sealed, and which are defined by the first and second sealed parts 251 and 253.

The first unsealed part 221 may be formed between the upper end (i.e. the outer end) of the upper wing portion 220a and the first sealed part 251. The second unsealed part 223 may be formed between the upper end of the upper wing portion 220a and the second sealed part 253. In one embodiment, the first unsealed part 221 has a width W1 smaller than a width W2' of the second unsealed part 223.

The third unsealed part 225 may be formed between the first sealed part 251 and the bottom end (i.e. the inner end) of the upper wing portion 220a. The fourth unsealed part 227 may be formed between the second sealed part 253 and the bottom end of the upper wing portion 220a. In one embodiment, the third unsealed part 225 has a width W3 greater than a width W4 of the fourth unsealed part 227. The width W1' of the first unsealed part 221 may be smaller than the width W3 of the third unsealed part 225, and the width W2' of the second unsealed part 223 may be greater than the width W4 of the fourth unsealed part 227.

Since, in one embodiment, the width W1' of the first unsealed part 221 is less than the width W3 of the third unsealed part 225, the first sealed part 251 is formed closer to the top end (i.e. the outer end) of the upper wing portion 220a than to the bottom end (i.e. the inner end) of the upper wing portion 220a. In addition, in one embodiment, since the width W2' of the second unsealed part 223 is greater than the width W4 of the fourth unsealed part 227, the second sealed part 253 is formed closer to the bottom end of the upper wing portion 220a than to the top end of the upper wing portion 220a.

In one embodiment, a sum of the widths W1' and W3 of the first and third unsealed parts 221 and 225 may be smaller than the width Wa' of the first sealed part 251 formed between the first and third unsealed parts 221 and 225, and a sum of the widths W2' and W4 of the second and fourth unsealed parts 223 and 227 may be smaller than the width Wb of the second sealed part 253 formed between the second and fourth unsealed parts 223 and 227. The reason for the foregoing is to securely seal the electrode assembly 210 in the pouch case 220 by sufficiently securing an area of the first and second sealed parts 251 and 253 while forming unsealed regions, such as the first, second, third, and fourth unsealed parts 221, 223, 225, and 227.

In the embodiment of FIGS. 2A and 2B, unlike in the embodiment of FIGS. 1A and 1B in which the sealed part may be formed along a centerline of the upper wing portion, the sealed part 251 located at a location corresponding to the electrode tab is formed closer to the electrode tab, while the sealed part 253 located at another location not corresponding to the electrode tab is formed closer to a cell space of the pouch case 220. In one embodiment, a portion of the first sealed part 251 and a portion of the second sealed part 253 may be formed to overlap each other such that an unsealed part is not formed between the first sealed part 251 and the second sealed part 253.

According to the embodiment of FIGS. 2A and 2B, the sealed part 251 located at a location of the upper wing portion 220a corresponding to the electrode tab is formed closer to the electrode tab, while the sealed part 253 located at another location not corresponding to the electrode tab is formed closer to a cell space of the pouch case 220. Thus, one problem with the conventional sealed part structure, that is, occurrence of separator fusion, can be suppressed, thereby preventing or substantially preventing failings such as a reduction in electrolyte impregnating capability or degassing. In addition, another problem with the conventional sealed part structure, that is, occurrence of an inner layer lifting phenomenon, can be suppressed, thereby attaining a desired total height margin of the pouch case.

Some exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A secondary battery comprising:
   an electrode assembly;
   a pouch case accommodating the electrode assembly and comprising a wing portion at an end of the pouch case, the pouch case including an unsealed part and a sealed part at the wing portion of the pouch case; and
   an electrode tab including a first side electrically connected to the electrode assembly, and a second side drawn out from the pouch case in a first direction through the wing portion,
   wherein the unsealed part includes a first unsealed part at an outer periphery of the wing portion which is directed toward the second side of the electrode tab, and a second unsealed part at an inner periphery of the wing portion which is directed toward the electrode assembly, and wherein the sealed part is between the first unsealed part and the second unsealed part, and
   wherein a width in the first direction of the second unsealed part at a first location is greater than a width in the first direction of the second unsealed part at a second location spaced apart from the first location in a lengthwise direction perpendicular to the first direction.

2. The secondary battery of claim 1, wherein each of a width of the first unsealed part and the width of the second unsealed part is less than a width of the sealed part.

3. The secondary battery of claim 1, wherein a width of the sealed part is less than a width of the wing portion.

4. The secondary battery of claim 1, wherein a sum of a width of the first unsealed part and the width of the second unsealed part is less than a width of the sealed part.

5. A secondary battery comprising:
an electrode assembly;
a pouch case accommodating the electrode assembly and including a sealed part at a portion of a wing portion of the pouch case; and
an electrode tab including a first side electrically connected to the electrode assembly, and a second side drawn out from the pouch case through the wing portion,
wherein the sealed part includes a first sealed part at a location corresponding to the electrode tab, and a second sealed part at another location not corresponding to the electrode tab, the first sealed part being adjacent to an outer side of the wing portion directed toward the second side of the electrode tab, and the second sealed part being adjacent to an inner side of the wing portion directed toward the electrode assembly, a distance from the second sealed part to the inner side of the wing portion being less than a distance from the first sealed part to the inner side of the wing portion.

6. The secondary battery of claim 5, wherein a width of the first sealed part is less than a width of the wing portion.

7. The secondary battery of claim 5, wherein a width of the second sealed part is less than a width of the wing portion.

8. The secondary battery of claim 5, wherein a width of the first sealed part is equal to a with of the second sealed part.

9. The secondary battery of claim 5, wherein the wing portion includes a first unsealed part between the outer side of the wing portion and the first sealed part.

10. The secondary battery of claim 5, wherein the wing portion includes a second unsealed part between the outer side of the wing portion and the second sealed part.

11. The secondary battery of claim 5, wherein the wing portion includes a third unsealed part between the first sealed part and the inner side of the wing portion.

12. The secondary battery of claim 5, wherein the wing portion includes a fourth unsealed part between the second sealed part and the inner side of the wing portion.

13. A secondary battery comprising:
an electrode assembly;
a pouch case accommodating the electrode assembly and including a sealed part at a portion of a wing portion of the pouch case; and
an electrode tab including a first side electrically connected to the electrode assembly, and a second side drawn out from the pouch case through the wing portion,
wherein the sealed part includes a first sealed part at a location corresponding to the electrode tab, and a second sealed part at another location not corresponding to the electrode tab, the first sealed part being adjacent to an outer side of the wing portion directed toward the second side of the electrode tab, and the second sealed part being adjacent to an inner side of the wing portion directed toward the electrode assembly, and
wherein the wing portion includes a first unsealed part between the outer side of the wing portion and the first sealed part, and a second unsealed part between the outer side of the wing portion and the second sealed part, and wherein a width of the first unsealed part is less than a width of the second unsealed part.

14. A secondary battery comprising:
an electrode assembly;
a pouch case accommodating the electrode assembly and including a sealed part at a portion of a wing portion of the pouch case; and
an electrode tab including a first side electrically connected to the electrode assembly, and a second side drawn out from the pouch case through the wing portion,
wherein the sealed part includes a first sealed part at a location, corresponding to the electrode tab, and a second sealed part at another location not corresponding to the electrode tab, the first scaled part being, adjacent to an outer side of the wing portion directed toward the second side of the electrode tab, and the second sealed part being adjacent to an inner side of the wing portion directed toward the electrode assembly, and
wherein the wing portion includes a third unsealed part between the first sealed part and the inner side of the wing portion, and a fourth unsealed part between the second sealed part and the inner side of the wing portion, and wherein a width of the third unsealed part is greater than a width of the fourth unsealed part.

15. The secondary battery of claim 5, wherein the wing portion includes a first unsealed part between the outer side of the wing portion and the first sealed part, and a third unsealed part between the first sealed part and the inner side of the wing portion, and wherein a width of the first unsealed part is less than a width of the third unsealed part.

16. The secondary battery of claim 5, wherein the wing portion includes a second unsealed part between the outer side of the wing portion and the second sealed part, and a fourth unsealed part between the second sealed part and the inner side of the wing portion, and wherein a width of the second unsealed part is greater than a width of the fourth unsealed part.

17. The secondary battery of claim 5, wherein a portion of the first sealed part and a portion of the second sealed part overlap each other.

* * * * *